US012798130B2

(12) United States Patent
De Vries

(10) Patent No.: US 12,798,130 B2
(45) Date of Patent: Nov. 17, 2026

(54) MOUNTING ASSEMBLY

(71) Applicant: KONINKLIJKE PHILIPS N.V., Eindhoven (NL)

(72) Inventor: Alwin William De Vries, Zuidlaren (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 19/123,433

(22) PCT Filed: Oct. 16, 2023

(86) PCT No.: PCT/EP2023/078585
§ 371 (c)(1),
(2) Date: Apr. 23, 2025

(87) PCT Pub. No.: WO2024/088799
PCT Pub. Date: May 2, 2024

(65) Prior Publication Data

US 2026/0008190 A1 Jan. 8, 2026

(30) Foreign Application Priority Data

Oct. 25, 2022 (EP) .................................... 22203690

(51) Int. Cl.
*B26B 19/04* (2006.01)

(52) U.S. Cl.
CPC .................................. *B26B 19/048* (2013.01)

(58) Field of Classification Search
CPC ... B26B 19/048; B26B 19/386; B26B 19/063; B26B 19/12; B26B 21/40; B26B 21/521;

(Continued)

(56) References Cited

U.S. PATENT DOCUMENTS 1,997,096 A * 4/1935 Andis .................. B26B 19/063 30/199
2,099,537 A * 11/1937 Schmitt .................. B26B 19/02 30/34.2

(Continued)

FOREIGN PATENT DOCUMENTS

CN 210633713 U 5/2020
DE 102010042888 A1 4/2012

(Continued)

OTHER PUBLICATIONS

International Search Report Dated Dec. 18, 2023 For International Appln. No. PCT/EP2023/078585 Filed Oct. 16, 2023.

*Primary Examiner* — Ghassem Alie

(57) ABSTRACT

According to an aspect, there is provided a mounting assembly (20) for a hair cutting appliance (10), the mounting assembly comprising: •a head (22) configured to receive a cutting unit and comprising: •a body (24) extending along an elongate axis (50); •a driving bridge (26) configured to couple to the cutting unit and to reciprocally move relative to the body along the elongate axis to reciprocally move the cutting unit relative to the body; •a primary head bearing surface (44); and•a separate secondary head bearing surface (52); •a counterpart (40) pivotably coupled to the head, the counterpart comprising: •a primary counterpart bearing surface (46) configured to cooperate with the primary head bearing surface to permit sliding rotation of the counterpart relative to the head about a first rotational axis (60) which is parallel to the elongate axis, and configured to contact the primary head bearing surface along a contact line to limit movement of the head towards the counterpart along a second axis (30) perpendicular to the first rotational axis; and a secondary counterpart bearing surface (54) separate from the primary counterpart bearing surface and configured to cooperate with the secondary head bearing surface to (Continued)

permit sliding rotation of the counterpart relative to the head about the first rotational axis, and configured to bear against the secondary head bearing surface to limit movement of the head relative to the counterpart along a third axis (70) which is perpendicular to the second axis and the first rotational axis; and a driving unit (34) comprising a driving axle (36) and a socket (38), the driving axle comprising an eccentric pin (42) cooperating with the driving bridge to impart reciprocating motion to the driving bridge, and the socket being configured to cooperate with a motor (14).

13 Claims, 5 Drawing Sheets

(58) Field of Classification Search

CPC . B26B 21/4012; B26B 21/4018; B26B 21/38; B26B 21/4062

USPC ........... 30/340, 34.1, 43.6, 43.91, 45.47, 51, 30/199.208, 209.21, 211, 216.22

See application file for complete search history.

(56) References Cited

U.S. PATENT DOCUMENTS

| | | | | | |
|---|---|---|---|---|---|
| 3,279,056 | A * | 10/1966 | Andis | B26B 19/042 30/346.51 |
| 3,319,334 | A * | 5/1967 | Bond | B26B 19/04 30/43.92 |
| 6,161,287 | A | 12/2000 | Swanson | |
| 2012/0210586 | A1 | 8/2012 | Lelieveld | |
| 2018/0085937 | A1 * | 3/2018 | Erndt | B26B 19/3846 |
| 2018/0085938 | A1 * | 3/2018 | Peter | B26B 19/048 |
| 2023/0150156 | A1 * | 5/2023 | Park | B26B 21/521 30/43.9 |

FOREIGN PATENT DOCUMENTS

| | | | | |
|---|---|---|---|---|
| DE | 102018220223 | A1 | 5/2020 | |
| EP | 3450119 | A1 | 3/2019 | |
| EP | 3907045 | A1 | 11/2021 | |
| GB | 2266070 | A | 10/1993 | |
| WO | WO-2015158681 | A1 * | 10/2015 | B26B 19/28 |
| WO | 2021099969 | A1 | 5/2021 | |

* cited by examiner

MOUNTING ASSEMBLY

CROSS-REFERENCE TO PRIOR APPLICATIONS

This application is a U.S. National Phase patent application under 35 U.S.C. § 371 of International Patent Application No. PCT/EP2023/078585, filed on Oct. 16, 2023, which claims the benefit of European Patent Application No. 22203690.7 filed on Oct. 25, 2022. These applications are hereby incorporated by reference herein.

FIELD OF THE INVENTION

The present disclosure relates to a mounting assembly for a hair cutting appliance and a hair cutting appliance.

BACKGROUND OF THE INVENTION

Hair cutting appliances typically comprise a cutting unit, and it is beneficial to enable the cutting unit to be pivotable relative to a handle, in order to be able to follow the contours of a user's skin surface to create optimal contact between the user's skin and the cutting unit, to attain the best cutting performance.

SUMMARY OF THE INVENTION

According to a first specific aspect, there is provided a mounting assembly for a hair cutting appliance, the mounting assembly comprising:

- a head configured to receive a cutting unit and comprising:
  - a body extending along an elongate axis;
  - a driving bridge configured to couple to the cutting unit and to reciprocally move relative to the body along the elongate axis to reciprocally move the cutting unit relative to the body;
  - a primary head bearing surface; and
  - a separate secondary head bearing surface;
- a counterpart pivotably coupled to the head, the counterpart comprising:
  - a primary counterpart bearing surface configured to cooperate with the primary head bearing surface to permit sliding rotation of the counterpart relative to the head about a first rotational axis which is parallel to the elongate axis, and configured to contact the primary head bearing surface along a contact line to limit movement of the head towards the counterpart along a second axis perpendicular to the first rotational axis; and
  - a secondary counterpart bearing surface separate from the primary counterpart bearing surface and configured to cooperate with the secondary head bearing surface to permit sliding rotation of the counterpart relative to the head about the first rotational axis, and configured to bear against the secondary head bearing surface to limit movement of the head relative to the counterpart along a third axis which is perpendicular to the second axis and the first rotational axis; and
- a driving unit comprising a driving axle and a socket, the driving axle comprising an eccentric pin cooperating with the driving bridge to impart reciprocating motion to the driving bridge, and the socket being configured to cooperate with a motor.

The primary head and counterpart bearing surfaces being separate from the secondary head and counterpart bearing surfaces, respectively, is intended to mean that the primary bearing surface and the respective secondary bearing surface are non-contiguous, or nonadjacent. It may be that the contact line between the primary head bearing surface and the primary counterpart bearing surface, may be parallel to the first rotational axis and the elongate axis.

It may be that the primary counterpart bearing surface is configured to contact the primary head bearing surface along a contact line is intended to mean that there is contact between the components only along the contact line, as opposed to surface contact.

It may be that the primary head bearing surface has a curved surface with a first radius from a primary head centrepoint, and a radius of curvature about a primary counterpart centrepoint of the primary counterpart bearing surface is larger than the first radius.

When assembled, the primary counterpart centrepoint and the primary head centrepoint may be collinear with one another and with the first rotational axis. The first radius may be equal to the radius of curvature of the primary counterpart bearing surface.

It may be that the secondary head bearing surface comprises a pair of opposing faces. It may be that a secondary counterpart bearing surface has an arcuate section with a second radius about the first rotational axis, wherein the second radius is smaller than a radius of curvature of the secondary head bearing surface.

The second radius may be equal to the radius of curvature of the secondary head bearing surface.

It may be that each opposing face of the secondary head bearing surface extending from the head comprises a substantially planar section and a concave curved section, wherein the concave curved section is closer to the counterpart along the second axis than the planar section and is configured to contact the secondary counterpart bearing surface to obstruct movement of the counterpart away from the head.

It may be that, during normal use, the concave curved section is configured to not contact the counterpart, such that there is some manufacturing tolerance in the position of the head and counterpart along the second axis.

It may be that the opposing faces of the secondary head bearing surface are substantially planar. It may be that the primary head bearing surface is integral with the body of the head. It may be that the secondary head bearing surface is integral with the body of the head. It may be that the primary head bearing surface is convex. It may be that the primary counterpart bearing surface is substantially planar. It may be that the secondary counterpart bearing surface is convex.

It may be that the mounting assembly further comprises a holding element, wherein the holding element is coupled to one of the head and the counterpart, and is configured to prevent separation of the head and the counterpart by bearing against a surface of the other of the counterpart and the head.

It may be that the mounting assembly further comprises a base pivotably coupled to the counterpart about a secondary rotational axis perpendicular to the rotational axis.

The secondary rotational axis may be aligned with a width axis of the body. The secondary rotational axis may be parallel to a plane through which the body extends.

According to a second aspect, there is provided a hair cutting appliance comprising: a mounting assembly according to a first aspect: a motor configured to be coupled to the driving unit: and a handle configured to be attached to the mounting assembly.

These and other aspects will be apparent from and elucidated with reference to the embodiment(s) described hereinafter.

BRIEF DESCRIPTION OF THE DRAWINGS

Exemplary embodiments will now be described, by way of example only, with reference to the following drawings, in which.

DETAILED DESCRIPTION OF THE EMBODIMENTS

Figure 1:
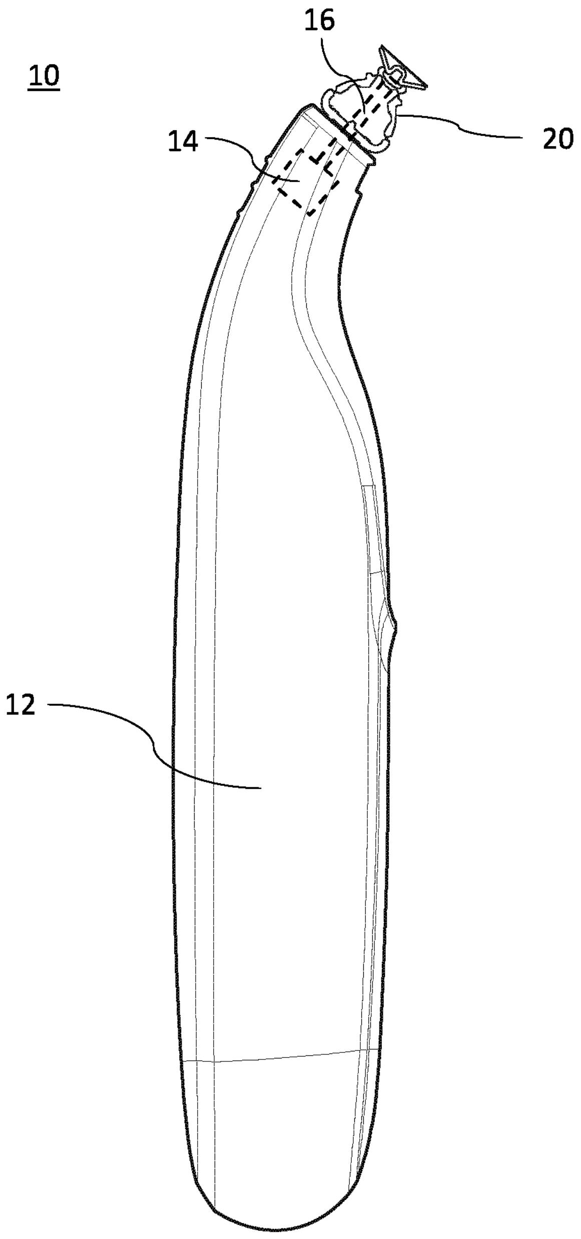
FIG. 1 schematically shows a side view of a hair cutting appliance.

FIG. 1 shows a hair cutting appliance 10 comprising a handle 12 for a user to hold the hair cutting appliance 10, and a mounting assembly 20, attached to the handle 12. A motor 14 is disposed within the handle 12, and a transfer shaft 16 extending from the motor 14 is coupled to the mounting assembly 20.

Figure 2:
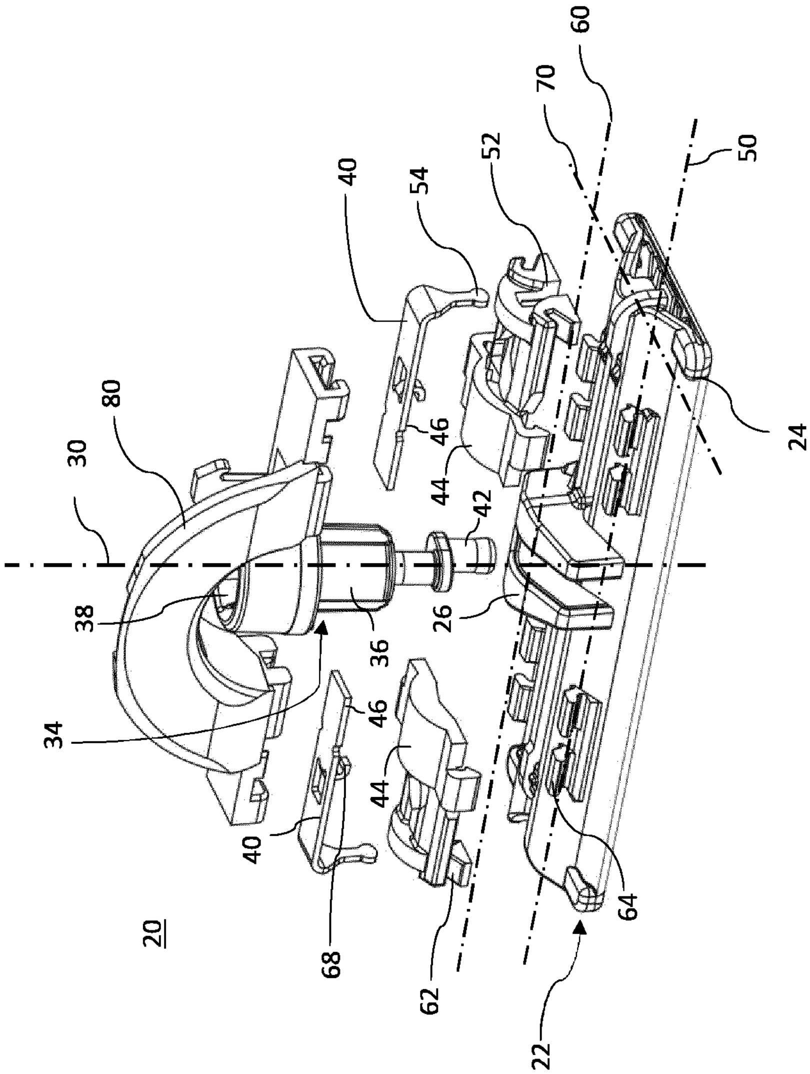
FIG. 2 schematically shows an exploded view of a first example mounting assembly.
Figure 4:
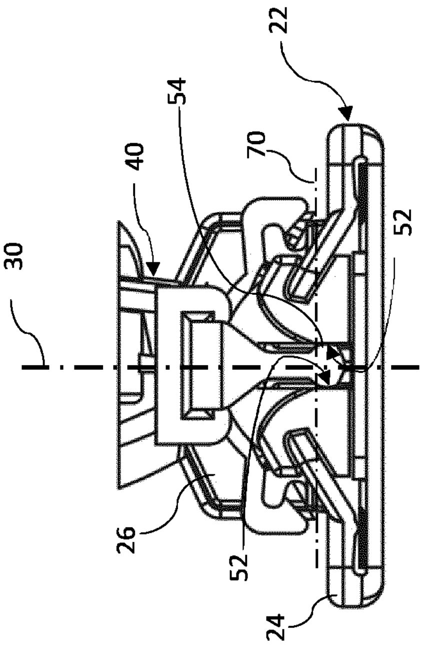
FIGS. 3 and 4 schematically show a front cross-sectional view and a side cross-sectional view of the first example mounting assembly.
Figure 3:
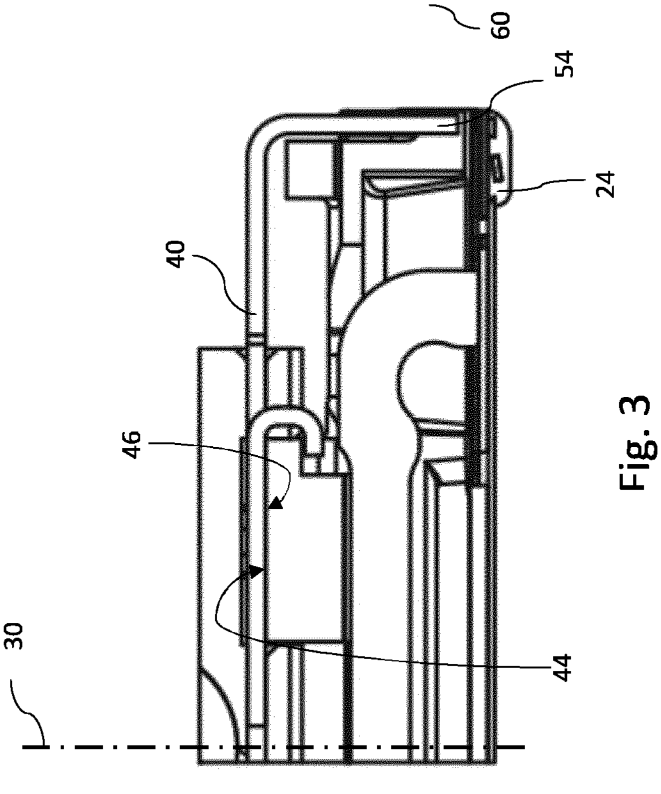

FIGS. 2-4 show a first example mounting assembly 20 comprising a head 22 configured to receive a cutting unit, a counterpart 40 which is pivotably coupled to the head 22, and a driving unit 34.

The head 22 comprises a body 24 extending along an elongate axis 50 and a driving bridge 26. The head 22 is configured to receive a cutting unit, such as a blade. The driving bridge 26 is configured to reciprocally move relative to the body 24 along the elongate axis 50. The driving bridge 26 is also coupled to the cutting unit, so that, when the driving bridge moves reciprocally relative to the body 24, the cutting unit is also moved reciprocally relative to the body 24, to enable it to cut hairs.

The driving unit 34 comprises a driving axle 36 and a socket 38 fixed together. The socket 38 is configured to cooperate with the motor 14, via the shaft 16, to impart rotary motion to the socket 38 and the driving axle 36 about its axis. The driving axle 36 comprises an eccentric pin 42 which is received in a channel of the driving bridge 26, to cooperate with the driving bridge 26, to impart reciprocating motion to the driving bridge 26 by rotation of the driving axle 36. The driving unit 34 is therefore configured to transfer rotary motion of the motor 14 into reciprocating motion of the driving bridge 26. The socket 38 is configured to receive, and cooperate with, the shaft 16 at various different angles, so that the socket 38 can pivotably move relative to the motor 14 without detrimentally impacting the ability of the driving unit 34 to transfer rotary motion of the motor 14 into reciprocating motion of the driving bridge 26.

The head 22 comprises a head component 62 which is fixed to the body 24 and which comprises a primary head bearing surface 44. The counterpart 40 comprises a primary counterpart bearing surface 46 which is configured to cooperate with the primary head bearing surface 44 to permit sliding rotation of the counterpart 40 relative to the head 22 about a first rotational axis 60 which is parallel to the elongate axis 50.

In this example, the primary head bearing surface 44 has a curved surface with a first radius from a primary head centrepoint. In this example, the primary head bearing surface 44 has a convex surface. In this example, the primary counterpart bearing surface 46 is planar. The primary head bearing surface 44 is in contact with the primary counterpart bearing surface 46 to limit movement of the head 22 towards the counterpart 40 along a second axis 30 which is perpendicular to the first rotational axis 60. In this example, the contact between the primary head bearing surface 44 and the primary counterpart bearing surface 46 is along a contact line. In other words, there is contact between the primary counterpart bearing surface 46 and the primary head bearing surface 44 only along the contact line. In this example, the contact line between the primary head bearing surface 44 and the primary counterpart bearing surface 46 is parallel to the first rotational axis 60 and the elongate axis 50.

In other examples, there may be surface contact between the primary head bearing surface 44 and the primary counterpart bearing surface 46. Having contact between these components along only a contact line, rather than a surface, means that sliding movement between the head 22 and the counterpart 40 is not over-constrained, so that it allows for a lower tolerance of the radius of curvature of the components (i.e., the construction has a higher tolerance for non-optimal radius). Having a planar counterpart bearing surface 46 is the simplest way to achieve the contact line between the head 22 and the counterpart 40, and to maximise the manufacturing and assembly tolerances.

In other examples, the primary counterpart bearing surface may have a corresponding curved surface, rather than a planar surface, with a radius of curvature, about a primary counterpart centrepoint, which is larger than or equal to the first radius. Having the primary head bearing surface 44 being convex, enables the first rotational axis 60 to be close to the skin surface (i.e., close to a surface of the head 22 which is configured to touch the skin of a user for cutting hair on the skin). In other words, the first rotational axis 60 is between the primary head bearing surface 44 and the cutting unit. In other examples, the primary head bearing surface may be concave or planar, with the primary counterpart bearing surface being convex, with a radius of curvature at least smaller than the surface of the primary head bearing surface. In such an example, the first rotational axis 60 would be further away from the skin surface in use, in other words, the primary head bearing surface would be between the first rotational axis and the cutting unit.

When assembled, in this example, the primary head centrepoint is collinear with the first rotational axis 60, so that the counterpart 40 can rotate about the first rotational axis 60 by sliding contact between the primary head bearing surface 44 and the primary counterpart bearing surface 46.

In this example, the head component 62 is separate to the body 24. The head component 62 is configured to be attached to the body 24 by slotting under a plurality of overhangs 64 projecting from the body 24. In other words, by moving the head component 62 along the elongate axis 60, it can slot in under the overhangs 64 to attach the body 24 to the head component 62. In other examples, the head component 62 may be integral with the body 24.

In this example, the counterpart 40 comprises an overhang protrusion 68 which is configured to cooperate with the head component 62 on an opposing side to the primary head bearing surface 44. The opposing side of the primary head bearing surface 44 bears against the counterpart 40 when assembled, to limit movement of the head 22 away from the counterpart 40. Therefore, the interaction of the counterpart 40 with the head component 62 (i.e., the head 22) limits movement of the head 22 away from the counterpart 40, and towards the counterpart 40, whilst permitting sliding rotation between the counterpart 40 and the head 22 about the first rotational axis 60.

In this example, the primary head bearing surface 44 comprises two separate surfaces which are spaced apart along the elongate axis 50, and the primary counterpart bearing surface 46 also comprises two corresponding surfaces which are spaced apart along the elongate axis 50, in order to provide more stability to the coupling of the head 22 with the counterpart 40 along the elongate axis 50.

The head component 62 of the head 22, in this example, also comprises a secondary head bearing surface 52 which is separate from the primary head bearing surface 44, and the counterpart 40 comprises a secondary counterpart bearing surface 54. The secondary counterpart bearing surface 54 is separate from the primary counterpart bearing surface 46.

The secondary head bearing surface 52 is configured to cooperate with the secondary counterpart bearing surface 54 to permit sliding rotation between the counterpart 40 and the head 22.

In this example, the secondary head bearing surface 52 comprises two parts which are spaced apart along the elongate axis 50, and the secondary counterpart bearing surface 54 also comprises two corresponding surfaces which are spaced apart along the elongate axis 50. Having the surfaces spaced apart along the elongate axis means that relative movement of the counterpart 40 and the head 22 can also be limited in a direction along the elongate axis 50.

In this example, each part of the secondary head bearing surface 52 comprises two opposing faces which are spaced apart along a third axis 70 which is perpendicular to both the first rotational axis 60 and the second axis 30. In this example, the opposing faces are planar. In other examples, the opposing faces may comprise curved surfaces.

In this example, each part of the secondary counterpart bearing surface has an arcuate section, which in this example is convex, with a second radius about the first rotational axis, when assembled. The second radius is smaller than or equal to the radius of curvature of the secondary head bearing surface 52, if it is curved (it is noted that a planar surface may be considered to have an infinite radius of curvature). Having the second radius smaller than the radius of curvature of the secondary head bearing surface 52 prevents the mechanism from being over-constrained and allows for larger tolerances in manufacturing. In other examples, the secondary counterpart surface may have a pair of opposing planar or concave sections, which bear against a convex secondary head bearing surface.

The secondary counterpart bearing surface 54 is also configured to bear against the opposing faces of the secondary head bearing surface 52 to limit movement of the head 22 relative to the counterpart 40 in both directions along the third axis 70. Therefore, the cooperation between the primary head bearing surface 44 with the primary counterpart bearing surface 46 and the secondary head bearing surface 52 with the secondary counterpart bearing surface 54 limits movement of the head 22 relative to the counterpart 40 along both the second axis 30 and the third axis 70, while having the bearing surfaces split and separated along the elongate axis 50 also limits movement of the head 22 relative to the counterpart 40 along the elongate axis 50. Therefore, the only movement that is permitted is rotational movement of the head 22 relative to the counterpart 40 about the first rotational axis 60.

In this example, the mounting assembly comprises a base 80 which is configured to be attached to the counterpart 40. In this example, the base 80 is fixed to the counterpart 40. In other examples, the base may be pivotably coupled to the counterpart about a secondary rotational axis which is perpendicular to the first rotational axis 60. The secondary rotational axis may be aligned with a width of the body (e.g., along the third axis 70). The secondary rotational axis may also be parallel to a plane through which the body extends.

Figure 5:
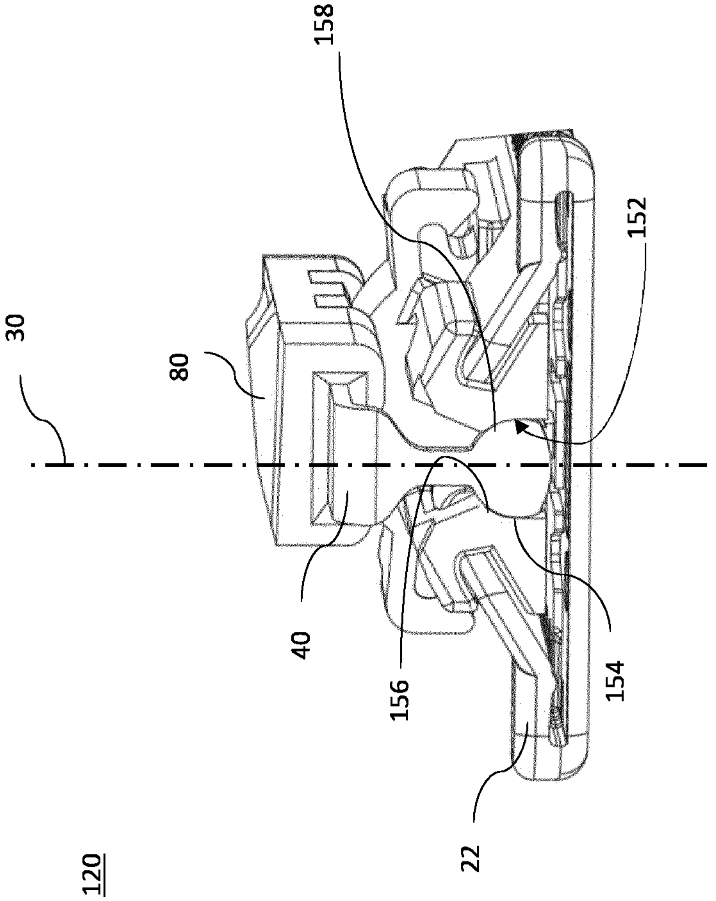
FIG. 5 schematically shows an oblique view of a second example mounting assembly.

FIG. 5 shows a second example mounting assembly 120. The second example mounting assembly 120 is similar to the first example mounting assembly 20, but differs in the head 22 comprising a secondary head bearing surface 152 which comprises two opposing faces which each comprise a substantially planar section 154 and a concave curved section 156. The concave curved section 156 is closer to the counterpart 40 and base 80 than the planar section 154, and is configured to contact the secondary counterpart bearing surface 158 to obstruct movement of the counterpart 40 away from the head 22 (in other words, to perform the function of the overhang protrusion 68 described with reference to FIGS. 2-4). During normal use, the head 22 and the counterpart 40 are not in contact at the concave curved section 156 in order to reduce friction therebetween and to give higher manufacturing tolerances of the position of the head 22 relative to the counterpart 40.

Figure 6:
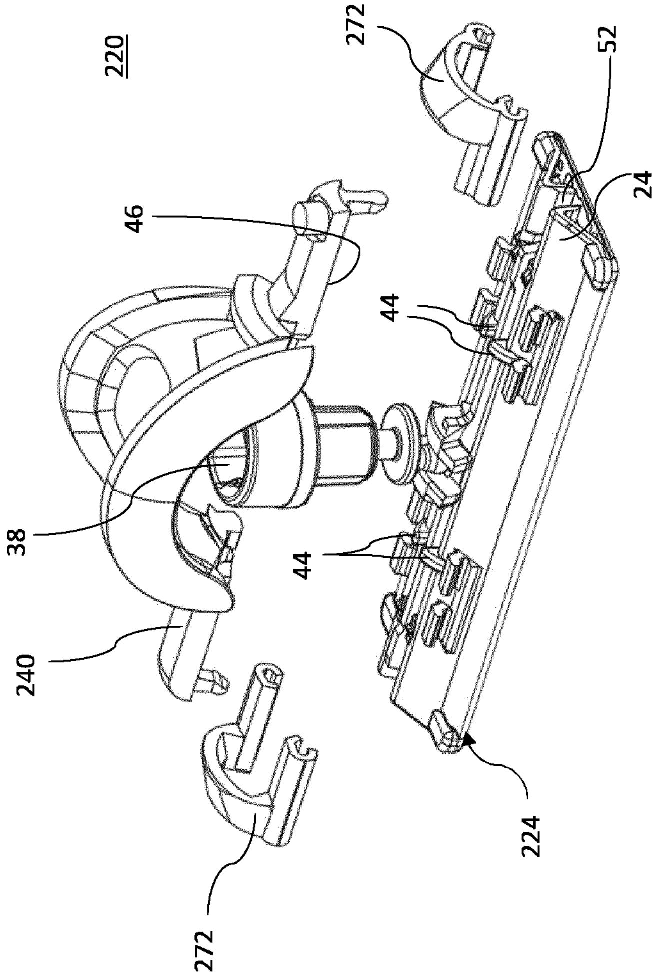
FIG. 6 schematically shows an exploded view of a third example mounting assembly.

FIG. 6 shows a third example mounting assembly 220. The third example mounting assembly 220 is similar to the first example mounting assembly 20 and the second example mounting assembly 120, but differs in that the head 22 comprises a body 224 which has the primary head bearing surface 44 and the secondary head bearing surface 52. In other examples, the body 224 may have only one of the primary head bearing surface 44 and the secondary head bearing surface 52.

The third example mounting assembly 220 further differs from the first example mounting assembly 20 and second example mounting assembly 120 in that the counterpart is integral with the base to form a unitary counterpart 240. In this example, a pair of holding elements 272 are attached to the head 22 and are configured to hold the unitary counterpart 240 in place relative to the head 22, by bearing against the counterpart 40, so that the primary head bearing surfaces 44 are in contact with the respective primary counterpart bearing surfaces 46, and to prevent separation of the head 22 and the unitary counterpart 240.

Reference to the primary head and counterpart bearing surfaces being separate from the secondary head and counterpart bearing surfaces, respectively, is intended to mean that the primary bearing surface and the respective secondary bearing surface are non-contiguous, or nonadjacent.

Variations to the disclosed embodiments can be understood and effected by those skilled in the art in practicing the principles and techniques described herein, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A mounting assembly for a hair cutting appliance, the mounting assembly comprising:

a driving unit comprising a driving axle and a socket, the driving axle comprising an eccentric pin received in a channel of a driving bridge and cooperating with the driving bridge to impart reciprocating motion to the driving bridge, and the socket being configured to cooperate with a motor;

a head configured to receive a cutting unit and comprising:

a body extending along an elongate axis;

the head further comprising the driving bridge configured to couple to the cutting unit and to reciprocally move relative to the body along the elongate axis to reciprocally move the cutting unit relative to the body;

a primary head bearing surface; and a separate secondary head bearing surface; and a counterpart pivotably coupled to the head, the counterpart comprising:

a primary counterpart bearing surface configured to cooperate with the primary head bearing surface to permit sliding rotation of the counterpart relative to the head about a first rotational axis which is parallel to the elongate axis, and configured to contact the primary head bearing surface along a line of physical contact between the primary counterpart bearing surface and the primary head bearing surface to limit movement of the head towards the counterpart along a second axis perpendicular to the first rotational axis; and a secondary counterpart bearing surface separate from the primary counterpart bearing surface and configured to cooperate with the secondary head bearing surface to permit sliding rotation of the counterpart relative to the head about the first rotational axis, and configured to bear against the secondary head bearing surface to limit movement of the head relative to the counterpart along a third axis which is perpendicular to the second axis and the first rotational axis.

2. A mounting assembly according to claim 1, wherein:

the primary head bearing surface has a curved surface with a first radius from a primary head centrepoint, and a radius of curvature about a primary counterpart centrepoint of the primary counterpart bearing surface is larger than the first radius.

3. A mounting assembly according to claim 1, wherein:

the secondary head bearing surface comprises a pair of opposing faces; and a secondary counterpart bearing surface has an arcuate section with a second radius about the first rotational axis, wherein the second radius is smaller than a radius of curvature of the secondary head bearing surface.

4. A mounting assembly according to claim 3, wherein each opposing face of the secondary head bearing surface extending from the head comprises a substantially planar section and a concave curved section, wherein the concave curved section is closer to the counterpart along the second axis than the planar section and is configured to contact the secondary counterpart bearing surface to obstruct movement of the counterpart away from the head.

5. A mounting assembly according to claim 3, wherein the opposing faces of the secondary head bearing surface are substantially planar.

6. A mounting assembly according to claim 1, wherein the primary head bearing surface is integral with the body of the head.

7. A mounting assembly according to claim 1, wherein the secondary head bearing surface is integral with the body of the head.

8. A mounting assembly according to claim 1, wherein the primary head bearing surface is convex.

9. A mounting assembly according to claim 1, wherein the primary counterpart bearing surface is substantially planar.

10. A mounting assembly according to claim 1, wherein the secondary counterpart bearing surface is convex.

11. A mounting assembly according to claim 1, further comprising a holding element, wherein the holding element is coupled to one of the head and the counterpart, and is configured to prevent separation of the head and the counterpart by bearing against a surface of the other of the counterpart and the head.

12. A mounting assembly according to claim 1, further comprising a base pivotably coupled to the counterpart about a secondary rotational axis perpendicular to the first rotational axis.

13. A hair cutting appliance comprising:

a mounting assembly according to claim 1;

a motor configured to be coupled to the driving unit, wherein the socket is configured to cooperate with the motor; and a handle configured to be attached to the mounting assembly.

* * * * *